US010713061B2

(12) United States Patent
Zhan et al.

(10) Patent No.: US 10,713,061 B2
(45) Date of Patent: Jul. 14, 2020

(54) BOOT DISK DETECTION AND MANAGEMENT IN AN INFORMATION HANDLING SYSTEM MANUFACTURING ENVIRONMENT

(71) Applicant: DELL PRODUCTS, LP, Round Rock, TX (US)

(72) Inventors: Daiqian Zhan, Austin, TX (US); Mark W. Shutt, Austin, TX (US); Price Tsai, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 226 days.

(21) Appl. No.: 15/715,891

(22) Filed: Sep. 26, 2017

(65) Prior Publication Data
US 2019/0095221 A1  Mar. 28, 2019

(51) Int. Cl.
*G06F 15/177* (2006.01)
*G06F 9/00* (2006.01)
*G06F 9/4401* (2018.01)

(52) U.S. Cl.
CPC .......... *G06F 9/4408* (2013.01); *G06F 9/4411* (2013.01)

(58) Field of Classification Search
CPC ............................ G06F 9/4408; G06F 9/4411
See application file for complete search history.

(56) References Cited

U.S. PATENT DOCUMENTS

| 6,115,815 | A | 9/2000 | Doragh et al. | |
|---|---|---|---|---|
| 2007/0043888 | A1* | 2/2007 | Suzuki | G06F 3/0611 710/62 |
| 2018/0260123 | A1* | 9/2018 | Andresen | G06F 3/0605 |

FOREIGN PATENT DOCUMENTS

| CN | 10-1499008 A | 8/2009 |
|---|---|---|
| CN | 10-1826020 A | 9/2010 |

* cited by examiner

*Primary Examiner* — Xuxing Chen
(74) *Attorney, Agent, or Firm* — Larson Newman, LLP

(57) ABSTRACT

An information handling system includes a storage device and a processor. The storage device includes a boot image for the information handling system. The processor determines an architectural location for a boot device for the information handling system, determines that the storage device is located at the architectural location of the information handling system, determines a unique identifier for the storage device, determines from a basic input/output system (BIOS) of the information handling system a BIOS identifier associated with the unique identifier, and places the BIOS identifier at the top of a BIOS boot order list.

20 Claims, 3 Drawing Sheets

BOOT DISK DETECTION AND MANAGEMENT IN AN INFORMATION HANDLING SYSTEM MANUFACTURING ENVIRONMENT

FIELD OF THE DISCLOSURE

This disclosure generally relates to information handling systems, and more particularly relates to boot disk detection and management in an information handling system manufacturing environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a storage device having a boot image for the information handling system. A processor may determine an architectural location for a boot device for the information handling system, determine that the storage device is located at the architectural location of the information handling system, determine a unique identifier for the storage device, determine from a basic input/output system (BIOS) of the information handling system a BIOS identifier associated with the unique identifier, and place the BIOS identifier at the top of a BIOS boot order list.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
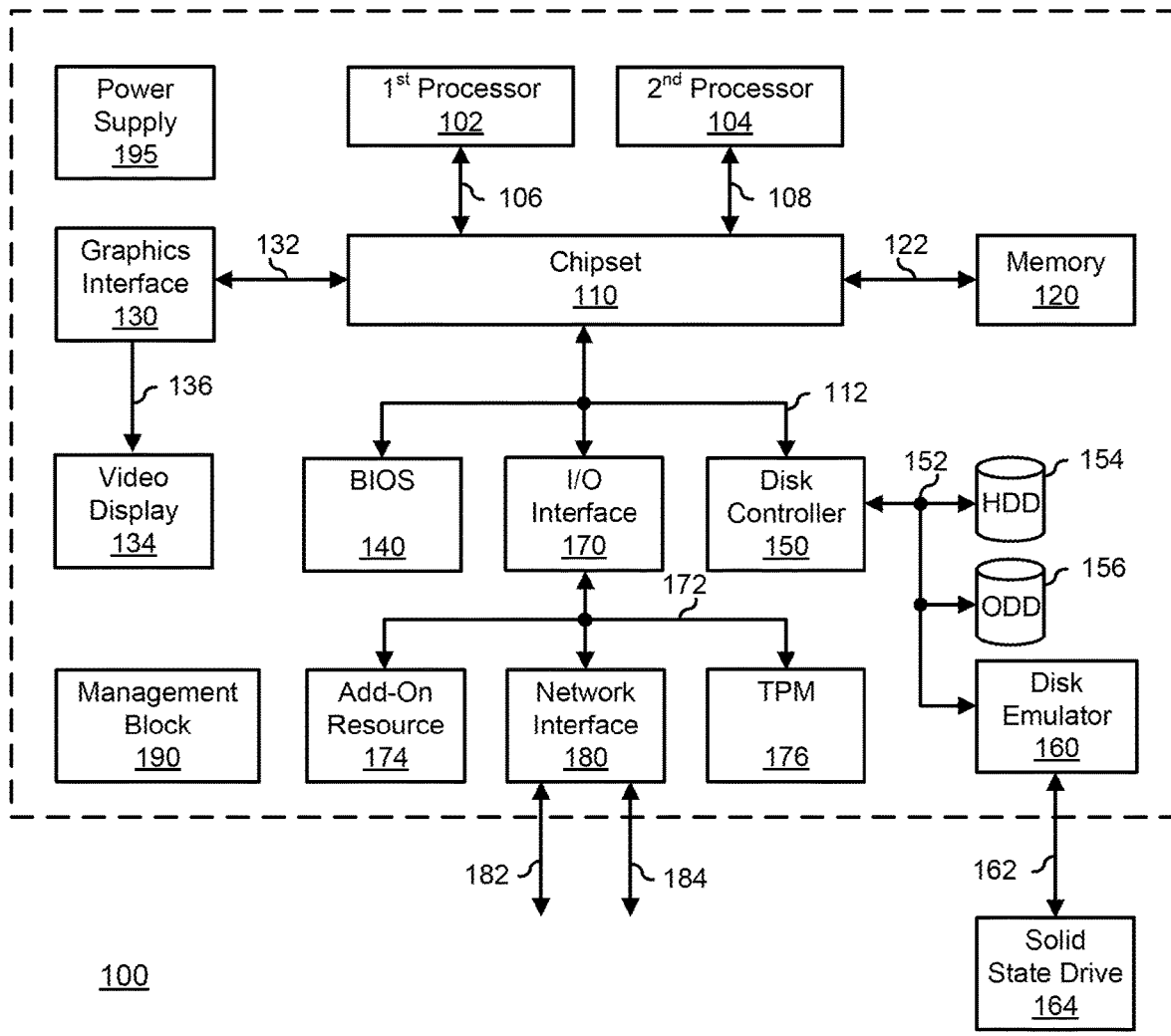
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system (BIOS)/universal extensible firmware interface (UEFI) module 140, hereinafter referred to as BIOS module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply

195. Processors 102 and 104, chipset 110, memory 120, graphics interface 130, BIOS module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS module 140 includes BIOS/UEFI code operable to detect resources within information handling system 100, to provide drivers for the resources, initialize the resources, and access the resources. BIOS module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI code or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI code or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
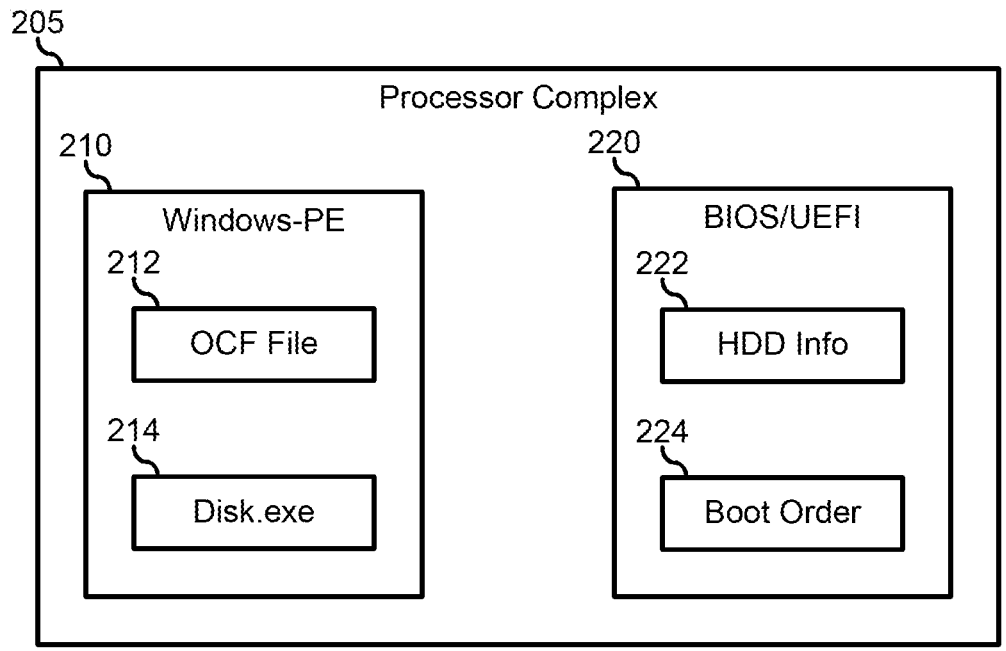
FIG. 2 is a block diagram illustrating an information handling system according to an embodiment of the present disclosure.
Figure 2:
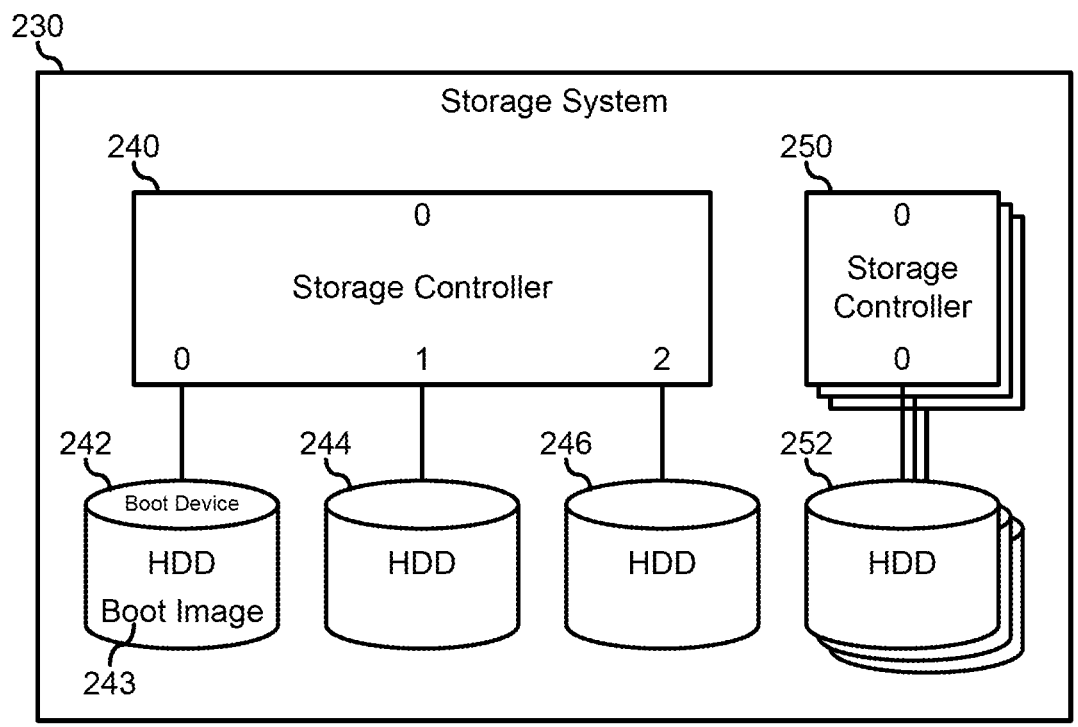

FIG. 2 illustrates an information handling system 200 including a processor complex 205, and a storage system 230. Processor complex 205 operates to provide data processing functionality of information handling system 200, such as is typically associated with an information handling system. As such, processor complex 210 represents a data processing apparatus, such as one or more central processing units (CPUs) or processor cores, and the associated data input and output I/O functionality, such as a chipset component, and other I/O processor components. Processor complex 210 operates to execute machine-executable code to perform the data processing tasks associated with information handling system 200. Storage subsystem 230 represents a long term data storage capacity for information handling system 200 and can include non-volatile memory devices, disk drives, RAID arrays, network attached storage (NAS), or storage-area network (SAN) or other storage devices, as needed or desired.

Processor complex 205 includes a Windows Pre-installation Environment (Windows-PE) 210 and a BIOS module 220. Windows-PE 210 includes an order configuration file (OCF) 212 and an executable disk information program 214. BIOS module 220 includes hard disk drive information 222 and a boot order setting 224. Storage sub-system 230 includes a storage controller 240 with attached storage devices 242, 244, and 246, and one or more additional storage controller 250 with one or more additional attached storage device 252. Storage device 242 is the boot device for information handling system 200, and includes a boot image 243.

Windows-PE 210 represents a light-weight version of a Windows operating system that is typically utilized by a manufacturer of information handling system 200 for the deployment of computer operating systems, troubleshooting, and the like. BIOS module 220 includes BIOS/UEFI code operable to detect resources within information handling system 200, to provide drivers for the resources, initialize the resources, and access the resources. In a particular embodiment, Windows-PE 210 is modified from its commercial form to include code that operates to detect resources within information handling system 200, to provide drivers for the resources, to initialize the resources, to access the resources, to provide manufacturing diagnostics, to initiate the customer OS installation, to customize BIOS settings, and the like. As such, as used herein, Windows-PE 210 can include either the commercial form of Microsoft Windows-PE, or a form of Windows-PE that includes additional code, as needed or desired. In a typical manufacturing process, Windows-PE 210 is installed on information handling system 200, or is accessible via a network installer, to install a customer operating system from storage device 242 at boot image 243, and to perform various set-up activities for the customer operating system. Then, the customer operating system is booted to perform its own initialization and set-up activities. Finally, information handling system 200 will reboot to Windows-PE 210 to finalize the installation of the customer operating system. After the customer operating system is installed, initialized, and set-up, information handling system 200 boots boot image 243 to launch the customer operating system. At this point, Windows-PE 210 is no longer needed to perform the installation and set-up activities, but the Windows-PE may remain resident on information handling system 200, such as for repair or troubleshooting of the customer operating system or other pre-boot activities, as needed or desired.

In a particular embodiment, Windows-PE 210 operates to enumerate storage devices 242, 244, 246, and 252 differently than does BIOS module 220, leading to contention and failure of the BIOS module to correctly detect storage device 242, leaving information handling system 200 unable to correctly boot to the customer operating system. Especially as the number of attached storage devices increases, and the variety of different types of storage devices multiplies, the ability of Windows-PE 210 and BIOS module 220 to consistently identify storage device 242 and boot image 243 as the correct boot device decreases.

Figure 3:
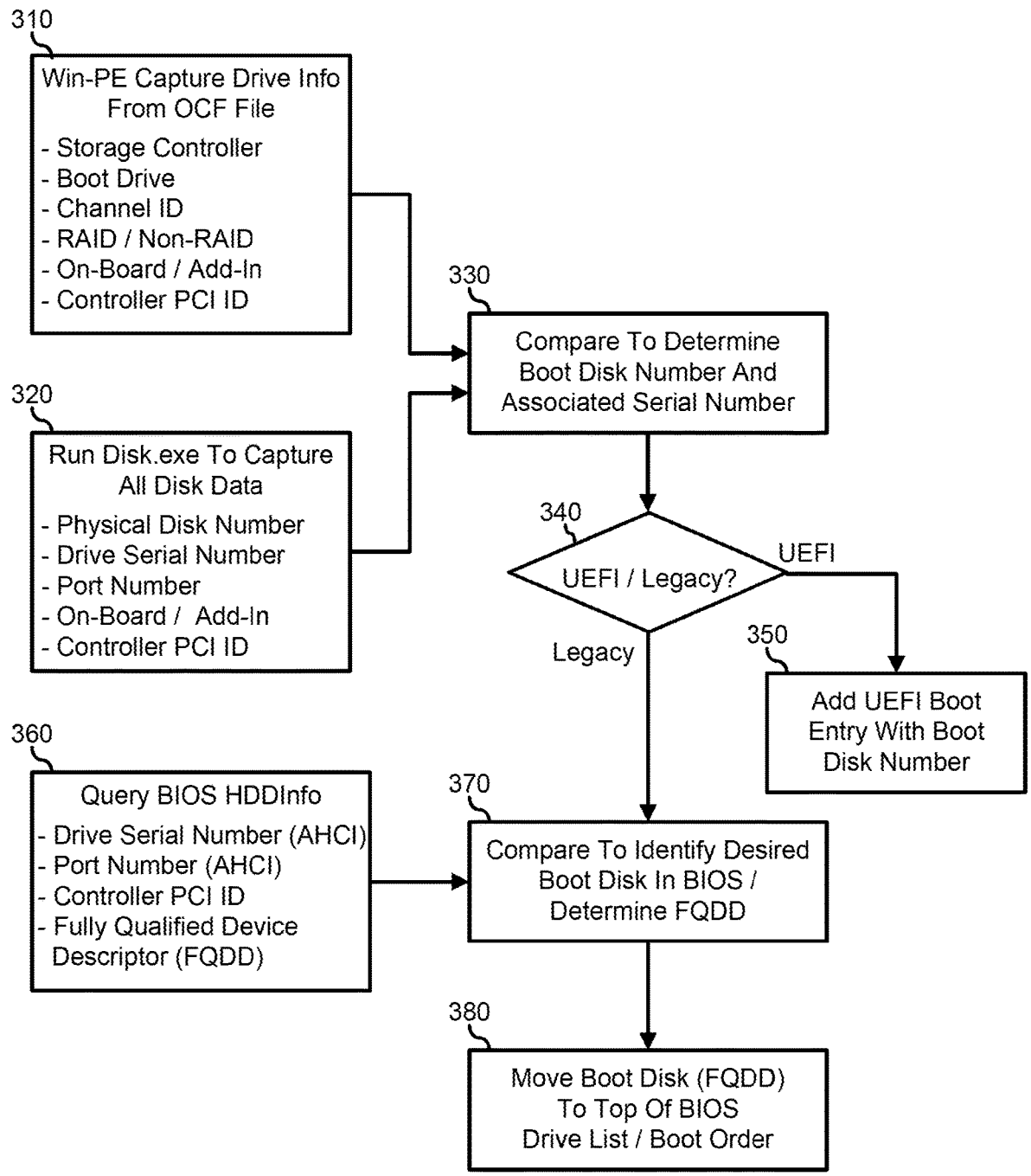
FIG. 3 is a flowchart illustrating a method for boot storage device detection and management in the information handling system of FIG. 2.

FIG. 3 illustrates a method for boot storage device detection and management in information handling system 200, beginning at block 310, where Windows-PE captures drive information from OCF 212. Here, OCF 212 includes information related to the installed storage devices 242, 244, 246, and 252 on information handling system 200. In a particular embodiment, OCF 212 is provided in the XML language, but other formats may be utilized as needed or desired. OCF 212 includes information related to storage controllers 240 and 250, to storage devices 242, 244, 246, and 252 including information to identify storage device 242 as the boot device, to the channel identification, to whether or not a storage controller is a RAID controller or is an internal controller, to a PCI identification for the storage controllers, and to other aspects of storage system 230, as needed or desired. OCF 212 can be provided based upon an integrated order processing system that correlates a desired information handling system build with the parts included therein. As such, OCF 212 includes information related to storage devices that are supposed to be installed in information handling system 200, and is not necessarily related to the actual population of storage devices in the information handling system. An example OCF is provided below, where storage controller 240 is identified as the boot controller, and storage device 242 is identified as the boot drive:

```
<CONTAINER name="driveconfiguration" type="xml" version=
"1.0.0.176">
  <CONTROLLERS>
    <CONTROLLER boot_controller="yes" controller_token="sc240">
      <DRIVES>
        <DRIVE>
          <ATTRIBUTE key="boot_drive" value="yes" />
          <ATTRIBUTE key="partNumber" value="HD242" />
          <ATTRIBUTE key="driveChannelID" value="0:0" />
          <ATTRIBUTE key="capacity(MB)" value="120000" />
          <ATTRIBUTE key="interface" value="serial" />
          <ATTRIBUTE key="sdrType" value="hard_drive(m2_ssd)"
```

```
          />
        </DRIVE>
        <DRIVE>
          <ATTRIBUTE key="boot_drive" value="no" />
          <ATTRIBUTE key="partNumber" value="HD244" />
          <ATTRIBUTE key="driveChannelID" value="0:1" />
          <ATTRIBUTE key="capacity(MB)" value="120000" />
          <ATTRIBUTE key="interface" value="serial" />
          <ATTRIBUTE key="sdrType" value="hard_drive(m2_ssd)"
          />
        </DRIVE>
        <DRIVE>
          <ATTRIBUTE key="boot_drive" value="no" />
          <ATTRIBUTE key="partNumber" value="HD246" />
          <ATTRIBUTE key="driveChannelID" value="0:2" />
          <ATTRIBUTE key="capacity(MB)" value="120000" />
          <ATTRIBUTE key="interface" value="serial" />
          <ATTRIBUTE key="sdrType" value="hard_drive(m2_ssd)"
          />
        </DRIVE>
      </DRIVES>
      <RAID_CONTAINERS />
      <SPARES />
    </CONTROLLER>
    <CONTROLLER boot_controller="no" controller_token="sc250">
      <DRIVES>
        <DRIVE>
          <ATTRIBUTE key="boot_drive" value="no" />
          <ATTRIBUTE key="partNumber" value="HD252" />
          <ATTRIBUTE key="driveChannelID" value="1:0" />
          <ATTRIBUTE key="capacity(MB)" value="800000" />
          <ATTRIBUTE key="interface" value="serial" />
          <ATTRIBUTE key="sdrType" value="hard_drive(hdd)" />
        </DRIVE>
      </DRIVES>
      <RAID_CONTAINERS />
      <SPARES />
    </CONTROLLER>
  </CONTROLLERS>
</CONTAINER>
```

Windows-PE 210 invokes disk information program 214 to capture information related to the installed storage devices 242, 244, 246, and 252 in block 320. Here, disk information program 214 is an executable program that operates to discover the installed storage controllers and storage devices on an information handling system, and to determine information related to the storage controllers and storage devices. In particular, disk information program 214 determines 1) a disk number or physical drive number of storage devices 242, 244, 246, and 252, 2) PCI identifiers for storage controllers 240 and 250, and an internal/external flag for the storage controllers and serial numbers for the storage devices, and 3) port locations for the storage devices. An example output from disk information program 214 is provided below:

PhysicalDrive0: Type:SSDModel MSATA 120034MB A001 Location:0:0 Internal NonRAID PCI01
PhysicalDrive1: Type:SSDModel MSATA 120034MB A002 Location:0:1 Internal NonRAID PCI01
PhysicalDrive0: Type:HDDModel MSATA 800034MB B004 Location:1:1 Internal NonRAID PCI02

Windows-PE 210 operates to compare the provided information from OCF 212 with the captured information from disk information program 214 in block 330. In particular, Windows-PE 210 determines from OCF 212 that the boot device is storage device 242 because it is the storage device that is identified with the boot storage controller 240, and is connected to the port that is identified as the boot port. Further, Windows-PE determines from disk information program 214 that the serial number for storage device 242, that is, the storage device that is located at controller 0 and port 0, is identified by a serial number "A001." As such, Windows-PE 210 conclusively determines that the boot device is located at controller 0 and port 0, has the serial number "A001," and is storage device 242.

A decision is made as to whether or not information handling system 200 is being booted to a legacy customer OS (Legacy boot mode), or to a UEFI customer OS (UEFI boot mode) in decision block 340. If information handling system 200 is being installed with the UEFI customer OS, the "UEFI" branch of decision block 240 is taken and the identification information for storage device 242 is provided to the UEFI boot entry, including the boot disk identifying information in block 350, and the BIOS, in UEFI boot mode, then correctly identifies the boot device based upon the identity of the storage device, and the BIOS properly boots from the boot device. If information handling system 200 is being installed with a legacy customer OS, the "Legacy" branch of decision block 340 is taken and the Windows-PE invokes HDDInfo command 222 in block 360. HDDInfo command 222 returned from the BIOS provides information from the storage devices that are installed in information handling system 200, including the serial number of the installed storage devices, the port to which the storage devices are attached, a PCI identifier for the storage controllers installed in the information handling system, and a Fully Qualified Device Descriptor (FQDD) for the installed storage devices. The FQDD is an identifier that is used to manipulate boot order 224 so that the BIOS knows which storage device to boot from. Note that the FQDD for each storage device is dependent upon the particular details of the BIOS execution, the configuration of information handling system 200, and other factors, such that the identification of a storage device to boot from based on boot order 224 is not guaranteed to be the storage device intended as the boot device based upon OCF 212. An example output from HDDInfo command 222 is provided below:

Drive0: PCIID=[PCI01] PortNum=[0] SerialNo-[A001] FQDD=[AHCI_SATA_Embedded:G]
Drive1: PCIID=[PCI01] PortNum=[1] SerialNo-[A002] FQDD=[AHCI_SATA_Embedded:H]
Drive2: PCIID=[PCI02] PortNum=[0] SerialNo-[B004] FQDD=[AHCI_SATA_Embedded:A]

Windows-PE 210 operates to compare the provided information from OCF 212 and the captured information from disk information program 214 in block 330 with the information derived from HDDInfo command 222 in block 370. Here, because HDDInfo 222 includes the serial numbers for storage devices 242, 244, 246, and 252, Windows-PE 210 correlates the serial number "A001" of storage device 242, as being the boot storage device that includes boot image 243, with the fact from HDDInfo 222 that storage device with the serial number "A001" is identified as having the FQDD value of "AHCI_SATA_Embedded:G." Windows-PE 210 then moves the FQDD associated with storage device 242 to the top of boot order 224 in BIOS module 220 in block 380, and any ambiguity between the desired boot device as provided in OCF 212 and boot order 224 is then resolved.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a storage device that includes a boot image for the information handling system; and
   a processor configured to:
      determine an architectural location within the information handling system where a boot device for the information handling system is expected to be located;
      determine that the storage device is located at the architectural location;
      determine a unique identifier for the storage device;
      determine, from a basic input/output system (BIOS) of the information handling system, a BIOS identifier associated with the unique identifier; and
      place the BIOS identifier at the top of a BIOS boot order list.

2. The information handling system of claim 1, further comprising:
   a storage controller, wherein the storage device is coupled to a port of storage controller.

3. The information handling system of claim 2, wherein the architectural location includes a channel identifier for the storage controller.

4. The information handling system of claim 3, wherein the channel identifier includes a Peripheral Component Interconnect identifier for the storage controller.

5. The information handling system of claim 2, wherein the architectural location includes the port.

6. The information handling system of claim 1, wherein the architectural location for the boot device is determined based upon an order configuration file.

7. The information handling system of claim 1, wherein the unique identifier includes a serial number of the storage device.

8. The information handling system of claim 1, wherein the processor is further configured to boot the information handling system to the boot image based upon the BIOS boot order list.

9. A method, comprising:
   providing, on a storage device of an information handling system, a boot image for the information handling system;
   determining, by a processor of the information handling system, an architectural location within the information handling system where a boot device for the information handling system is expected to be located;
   determining, by the processor, that the storage device is located at the architectural location;
   determining, by the processor, a unique identifier for the storage device;
   determining, by the processor, from a basic input/output system (BIOS) of the information handling system, a BIOS identifier associated with the unique identifier; and
   placing the BIOS identifier at the top of a BIOS boot order list.

10. The method of claim 9, further comprising:
    coupling the storage device to a port of a storage controller.

11. The method of claim 10, wherein the architectural location includes a channel identifier for the storage controller.

12. The method of claim 11, wherein the channel identifier includes a Peripheral Component Interconnect identifier for the storage controller.

13. The method of claim 10, wherein the architectural location includes the port.

14. The method of claim 9, wherein the architectural location for the boot device is determined based upon an order configuration file.

15. The method of claim 9, wherein the unique identifier includes a serial number of the storage device.

16. The method of claim 9, further comprising:
    booting, by the processor, the information handling system to the boot image based upon the BIOS boot order list.

17. An information handling system, comprising:
    a storage controller;
    a storage device coupled to a port of the storage controller, wherein the storage device includes a boot image for the information handling system; and
    a processor configured to:
       determine, from a grid cache file, an architectural location within the information handling system where a boot device for the information handling system is expected to be located;
       determine that the storage device is located at the architectural location;
       determine a unique identifier for the storage device;
       determine from a basic input/output system (BIOS) of the information handling system a BIOS identifier associated with the unique identifier; and
       place the BIOS identifier at the top of a BIOS boot order list.

18. The information handling system of claim 17, wherein the architectural location includes a channel identifier for the storage controller.

19. The information handling system of claim 17, wherein the architectural location includes the port.

20. The information handling system of claim 17, wherein the unique identifier includes a serial number of the storage device.

* * * * *